UNITED STATES PATENT OFFICE.

MIGUEL DE LA VEGA, OF NEW YORK, N. Y., ASSIGNOR OF ONE-HALF HIS RIGHT TO SANTIAGO LIMA, OF SAME PLACE.

IMPROVEMENT IN MANUFACTURE OF ARTIFICIAL TALLOW.

Specification forming part of Letters Patent No. 209,203, dated October 22, 1878; application filed December 18, 1877.

*To all whom it may concern:*

Be it known that I, MIGUEL DE LA VEGA, of the city, county, and State of New York, have invented a new and useful improvement, of which the following is a full, clear, and exact description.

The object of my invention is to produce artificial tallow and grease, of which the principal ingredient is vegetable matter. This artificial tallow is to be used for lubricating purposes, for the manufacture of soap, candles, &c., and for other similar purposes, but is not to be used for articles of food.

The principal vegetable ingredient which I use is the oil of the castor-bean, though I do not intend or wish to be understood as confining myself to this particular vegetable oil in producing my artificial tallow, but claim the right to use any other vegetable oil as a principal ingredient of my invention.

The proportions in which the various ingredients are mixed in producing my artificial tallow are given with reference to producing one hundred pounds of the same. For this purpose I use sixty pounds of castor-oil, ten pounds of animal tallow, ten pounds of vegetable oil, and twenty pounds of wheat-flour. The other vegetable oils that may be used are rape or turnip seed oil, cotton-seed oil, or any other similar oil.

The above ingredients, in the proportions stated, are to be put together in a vessel or other receptacle, and boiled about thirty minutes by steam-heat.

After the mixture has been treated in the manner above set forth, it is cooled, and solidifies and hardens into artificial tallow. The process of cooling can be facilitated by pouring cold water around the vessel or receptacle which holds the mixture.

A greater or less quantity than one hundred pounds can be produced at the same time, as desired, and then the proportions of the said ingredients are to be varied accordingly, the same relative proportions, however, being preserved.

Having thus described my invention, what I claim, and desire to secure by Letters Patent, is—

The above-described artificial tallow, composed of castor-oil, solid animal fat, and other vegetable oil, and wheat-flour, in the proportions specified, substantially as described.

In testimony that I claim the foregoing I have hereunto set my hand.

MIGUEL DE LA VEGA.

In presence of—
    CHARLES G. COE,
    LOUIS W. FROST.